United States Patent [19]
Cheng et al.

[11] Patent Number: 5,838,783
[45] Date of Patent: Nov. 17, 1998

[54] SMART DIRECTORY MANAGEMENT

[75] Inventors: Frank S. Cheng, East Brunswick; Randall J. Penning, Middletown; Michael D. Porter, Flanders, all of N.J.

[73] Assignee: Lucent Technologies, Inc., Murray Hill, N.J.

[21] Appl. No.: 579,176

[22] Filed: Dec. 27, 1995

[51] Int. Cl.[6] ................................................. H04M 7/00
[52] U.S. Cl. .......................... 379/355; 379/201; 379/279; 364/962.1
[58] Field of Search ..................... 379/355, 201, 379/88, 211, 221, 216, 396, 242, 279; 364/962.1, 964.34

[56] References Cited

U.S. PATENT DOCUMENTS

| | | | |
|---|---|---|---|
| 4,928,302 | 5/1990 | Kaneuchi et al. | 379/88 |
| 5,367,609 | 11/1994 | Hopper et al. | 379/214 |
| 5,396,547 | 3/1995 | Baals et al. | 379/355 |
| 5,483,586 | 1/1996 | Sussman | 379/201 |
| 5,509,058 | 4/1996 | Sestak et al. | 379/201 |
| 5,615,257 | 3/1997 | Pezzullo et al. | 379/396 |
| 5,661,789 | 8/1997 | Boyle et al. | 379/221 |

OTHER PUBLICATIONS

"Your Wildfire Electronic Assistant, " Wildfire Communiations, Inc., Lexington, Massachusetts, 1995.

*Primary Examiner*—Ahmad F. Matar
*Assistant Examiner*—Jacques M. Saint-Surin

[57] ABSTRACT

This invention provides a smart directory manager for deleting directory entries. The smart directory manager includes a directory memory, user interface devices and a directory management device. The directory management device generates a recommended delete-directory-entry of the directory memory and deletes the recommended delete-directory-entry from the directory memory when a delete instruction is received from a user. The directory management device generates the recommended delete-directory-entry by comparing information of each directory entry contained in the directory memory based on a predetermined delete strategy. The directory entry having the information that best satisfies the predetermined delete strategy is selected as the recommended delete-directory-entry.

10 Claims, 3 Drawing Sheets

SMART DIRECTORY MANAGEMENT

BACKGROUND OF THE INVENTION

1. Field of the Invention

This invention relates to a device and method for providing a recommended directory entry to be deleted from a directory.

2. Description of Related Art

Conventional telephone stations include directory features capable of storing a plurality of telephone numbers. Each telephone number is associated with a name of a party to be called. Many telephone stations provide a plurality of buttons where each button dials a specific number and the names of the parties to be called are written next to each button.

More sophisticated telephone stations contain an electronic memory storing both the telephone numbers and the names associated with each telephone number. When the directory memory is full, new names and telephone numbers are added only if some current directory entries are deleted. For large directory memories that store hundreds of names and telephone numbers, the task of deciding which name and telephone number to delete becomes formidable. Thus, there is a need to provide a method to assist the user in determining which of the possible entries is best deleted so that new entries may be entered.

SUMMARY OF THE INVENTION

An objective of the invention is to provide a smart directory manager for generating a recommended delete-directory-entry. The smart directory manager includes a directory memory containing a plurality of directory entries, a user interface device and a directory management device. The directory management device generates a recommended delete-directory-entry contained in the directory memory based on a predetermined delete strategy and information contained in the plurality of directory entries. The directory management device deletes the recommended delete-directory-entry from the directory memory when a delete instruction is received from the user through the user interface device.

The directory management device includes a directory manager, a delete advice generator that determines the recommended delete-directory-entry based on a predetermined delete strategy and information contained in the plurality of directory entries obtained from the directory memory through the directory manager and a delete function controller that controls the directory manager and the delete advice generator. The delete function controller communicates to the user through the user interface device by at least one of outputting to the user the recommended delete-directory-entry and receiving from the user data required by the directory management device.

The method for selecting a recommended delete-directory-entry from the plurality of directory entries in the directory memory includes selecting the recommended delete-directory-entry based on a predetermined delete strategy, outputting the recommended delete-directory-entry to a user through the user interface device, and deleting the recommended delete-directory-entry after receiving the delete instruction from the user.

BRIEF DESCRIPTION OF THE DRAWINGS

The invention will be described in detail with reference to the following drawings, wherein.

DETAILED DESCRIPTION OF PREFERRED EMBODIMENTS

Figure 1:
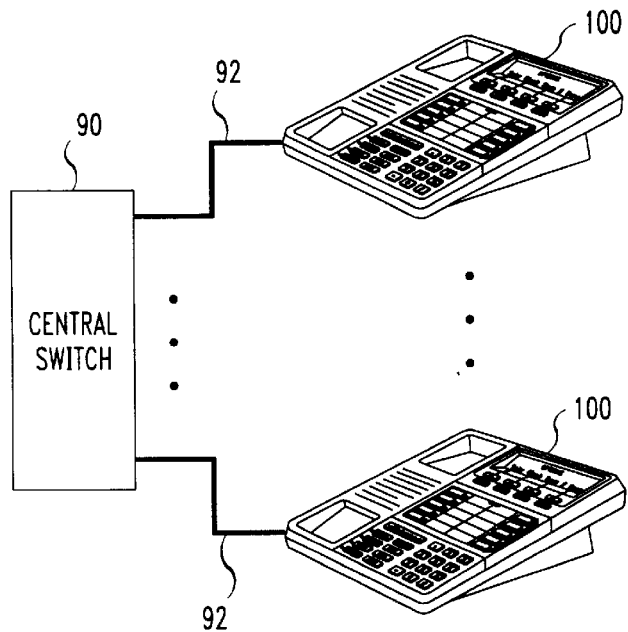
FIG. 1 is a block diagram of a plurality of telephone stations connected to a central switch.

FIG. 1 shows a block diagram including a plurality of telephone stations 100 connected to a central switch 90, such as a private branch exchange (PBX), through signal lines 92. Each of the signal lines 92 includes one bearer channel. The signal lines 92 may also include a signaling channel. The bearer channel carries digital or analog audio and/or application level data while the signaling channel carries interprocessor data. If the telephone station 100 is analog, separate bearer and signaling channels are not required.

Figure 2:
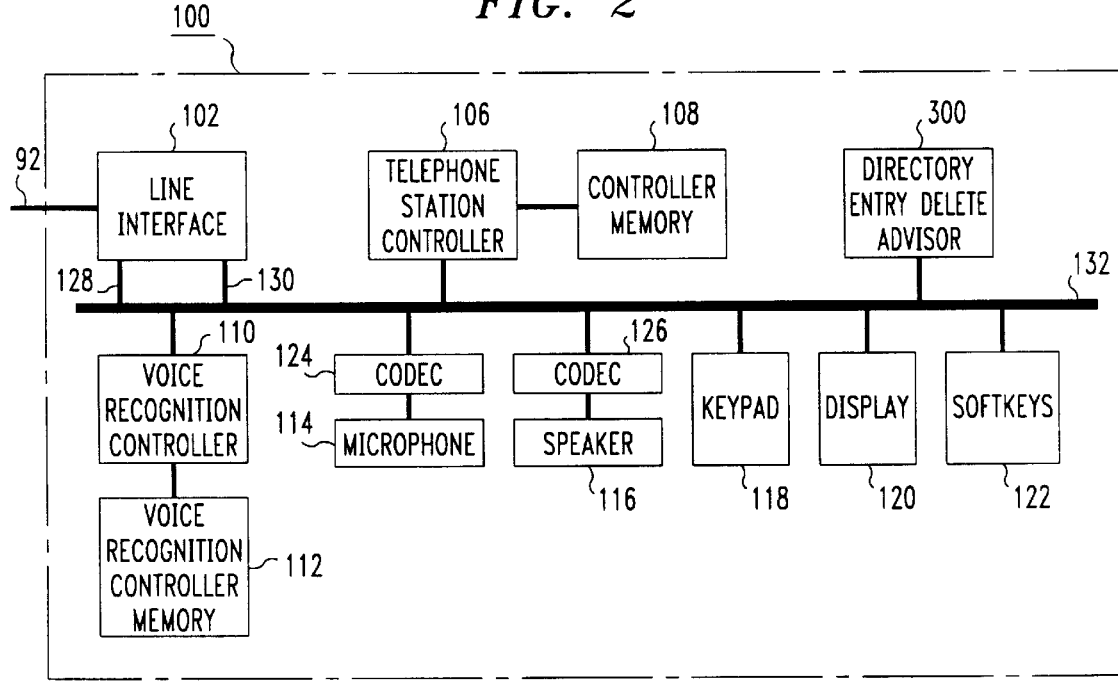
FIG. 2 is a block diagram of a preferred embodiment of a telephone station.

FIG. 2 shows a block diagram of the telephone station 100. The signal line 92 is input to the line interface 102. The line interface 102 converts the signal line 92 into a bearer channel 128 and a signaling channel 130. The signaling channel 130 contains information indicating that a caller has dialed the telephone number associated with the telephone station 100. The telephone station controller 106 scans the data on the signaling channel 130 through signal line 132. The signal line 132 interconnects the components of the telephone station 100 together. When the telephone station controller 106 detects that the telephone station 100 has been called, the telephone station controller 106 activates the telephone ringer (not shown) and when the user takes the telephone station 100 off-hook, the user is connected to the bearer channel 128 of the line interface 102 for conventional audio communication.

The voice recognition controller 110 connected to the signal line 132 also scans the signaling channel 130. When the voice recognition controller 110 detects special codes on the signaling channel 130, it accesses the bearer channel 128 and communicates with the external caller by outputting audio voice data and receiving audio voice commands from the caller.

Since the voice recognition controller 110 and the telephone station controller 106 can both interface directly with the bearer channel 128, two bearer channels 128 may be provided so that the voice recognition controller 110 and the telephone station controller 106 can both communicate through the two bearer channels 128 at the same time.

The telephone station controller 106 and the voice recognition controller 110 operate concurrently. However, if only one bearer channel 128 is available, then the telephone station controller 106 and the voice recognition controller 110 cannot both communicate through the single bearer channel 128. Thus, having two bearer channels 128 allows both the telephone station controller 106 and the voice recognition controller 110 to simultaneously communicate through the two bearer channels 128.

The voice recognition controller 110 interfaces with a user at the telephone station 100 through user interfaces such as a microphone 114, a speaker 116, a keypad 118, a display device 120, and soft keys 122. These user interfaces are coupled to the signal line 132 and are accessible by other telephone station elements such as the telephone station controller 106. The microphone 114 and the speaker 116 are connected to the signal line 132 through two CODEC units 124 and 126, respectively.

By pushing designated keys on the keypad 118, the user places the voice recognition controller 110 into a voice command spotting mode. When in the voice command spotting mode, the voice recognition controller 110 listens to the sounds surrounding the telephone station 100. When the voice recognition controller 110 recognizes one of predetermined voice commands stored in the voice recognition controller memory 112, the voice recognition controller 110 responds to the voice command.

If the voice recognition controller 110 requires additional information to be entered by the user, the voice recognition controller 110 speaks through the speaker 116 to inform the user of the required information. The voice recognition controller 110 may also request additional information from the user by displaying a request on the display device 120 in addition to speaking through the speaker 116. The user responds through the keypad 118 to enter the required data or simply talk to the voice recognition controller 110 through the microphone 114.

The voice recognition controller 110 also uses the display device 120 to indicate choices that the user may select. When options are displayed on the display device 120, the locations of the options are placed in a corresponding relationship with the soft keys 122. The user selects the displayed option by pushing a corresponding soft key 122.

Figure 3:
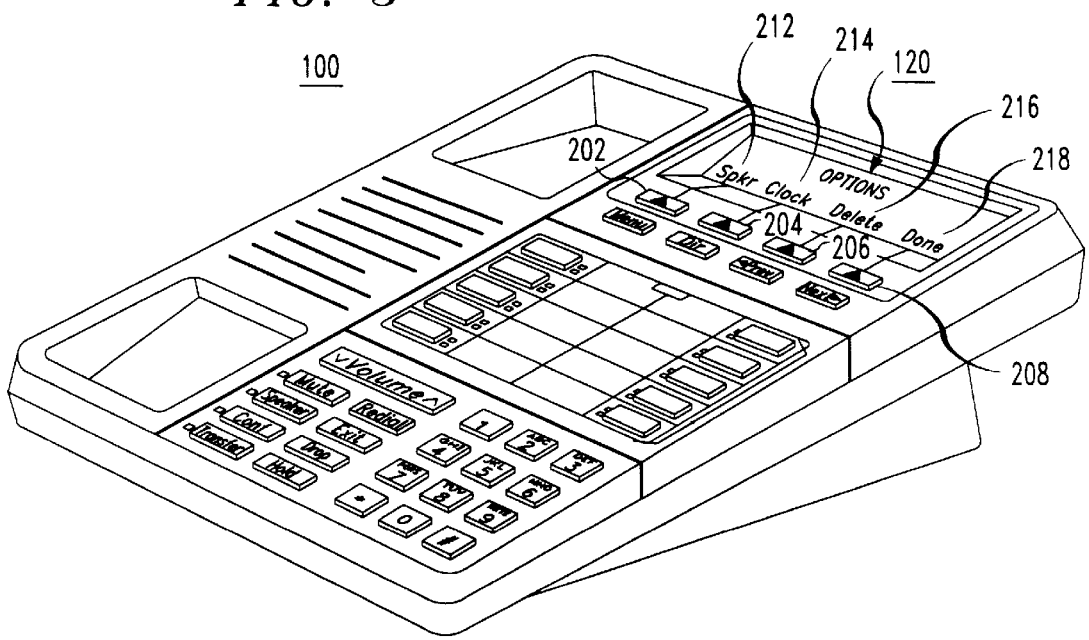
FIG. 3 is a diagram of soft keys.

FIG. 3 shows the display device 120 that has option display areas 212, 214, 216 and 218. Soft keys 202, 204, 206 and 208 are located close to the corresponding option selections displayed on the display device 120. The user selects the displayed option by simply pushing the corresponding soft key 202–208.

Figure 4:
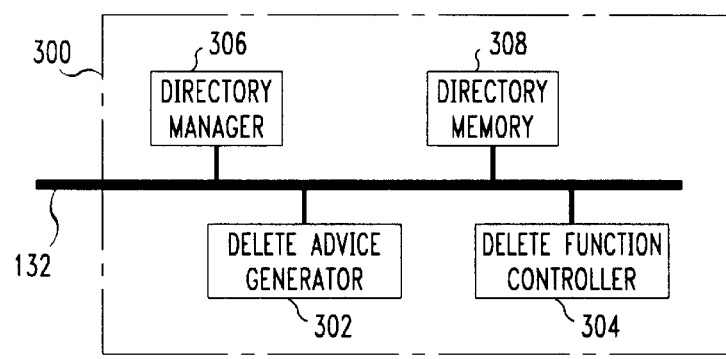
FIG. 4 is a block diagram of the directory entry delete advisor.

FIG. 2 shows a directory entry delete advisor 300 connected to the signal line 132. FIG. 4 shows that the directory entry delete advisor includes a directory manager 306, that manages the directory located in the directory memory 308, and a delete function controller 304. The delete function controller 304 controls the directory manager 306 and communicates to the voice recognition controller 110 through the signal line 132. The delete function controller 304 also receives information from the microphone 114, the keypad 118 and the soft keys 122, and outputs information to the user through the speaker 116 and on the display device 120.

The delete function can be initiated either explicitly by the user or automatically when the user tries to add a directory entry when the directory memory 308 is full. The user can initiate the delete function by a voice command received through the microphone 114, by pushing a button on the keypad 118 or by pushing one of the soft keys 122 corresponding to a delete option display on the display device 120.

The voice recognition controller 110 sends a message to the delete function controller 304 to begin the delete-directory-entry process, when it recognizes a delete command from the sounds surrounding the telephone station 100. If the delete command is entered through either the keypad 118 or one of the soft keys 122, the delete function controller 304 detects the entry of the command and begins the delete-directory-entry process.

When the delete-directory-entry process is started by one of the above methods, the delete function controller 304 commands the directory manager 306 to scan the directory memory 308 and collect information concerning each entry in the directory. The information associated with each directory entry are data such as an account number, an elapsed time since the directory entry was last used, a mean elapsed time of directory entry use, an importance of the directory entry to the user, the number of directory entry accesses over a previous N accesses of the total directory where N is a preset number and so on. This information is collected by the directory manager and provided to a delete advice generator 302.

The directory manager 300 updates the information for each directory entry during the time that each directory entry is accessed. Thus, the information for each directory entry is up-to-date when the delete process is requested.

The delete advice generator 302 recommends a directory entry to be deleted based on the predetermined delete strategy. For example, if the predetermined delete strategy recommends the most infrequently accessed entry as the delete-directory-entry, the delete advice generator 302 will select the directory entry either based on the location of the directory entry in an ordered stack of directory entries or the directory entry with the longest elapsed time as the recommended delete-directory-entry.

When the delete advice generator 302 selects the recommended delete-directory-entry based on the ordered stack of directory entries, the directory manager 300 arranges all the directory entries in the directory memory 308 as a stack that is ordered based on the order of functional accesses. A functional access is an access that serves an operational function such as making a call or accessing directory contents as compared to an administrative function such as collecting information from the directory memory for directory management. Whenever a directory entry is functionally accessed, the accessed directory entry is placed on top of the ordered stack so that at any time the directory entries are arranged according to the most recently functionally accessed order. The delete advice generator 302 selects the directory entry at the bottom of the ordered stack as the recommended delete-directory-entry.

If the delete advice generator 302 recommends the directory entry having the longest elapsed time, an elapsed time since the last functional access of each directory entry is stored in the directory memory 308. The delete advice generator 302 compares the elapsed time of each directory entry provided by the directory manager 306 with the elapsed time of other directory entries and selects the directory entry having the longest elapsed time as the recommended delete-directory-entry.

Other delete strategies can also be provided such as recommending entries with the longest mean functional access times or entries that are determined to be the least important to the user based on previously entered importance values.

After the delete advice generator 302 determines a recommended delete-directory-entry, the delete function controller communicates to the user through either the display 120 or the speaker 116.

The user responds by voice through the microphone 114, by pushing a button on the key pad 118 or by pushing a soft key 122 corresponding to a displayed option on the display device 120. If the user decides to delete the recommended delete-directory-entry, the delete function controller 304 commands the directory manager 306 to delete the recommended delete-directory-entry from the directory memory 308. If the user decides against deleting the recommended delete-directory-entry, the user can either request the directory entry delete advisor to make a second recommendation or to exit the delete process and not delete any directory entry.

The directory memory 308 may store many different types of information. As discussed above, information such as elapsed time since the last functional access, the mean elapsed time since the last access and the importance of the directory entry to the user can be stored in the directory memory 308 associated with each directory entry. The directory memory 308 may also store voice prints.

When a voice print is deleted, the delete function controller 304 may request the user to make a second deletion based on a system requirement of the directory entry delete advisor. If a voice print is associated with each directory entry, the memory associated with each voice print may vary depending on a length in terms of the number of seconds of a specific voice print. If the deleted directory entry has a very short voice print, the system will require an additional directory entry to be deleted so that the amount of memory made available will be greater than a preset value such as two seconds.

For example, for a preset value of two seconds worth of voice print, the delete function controller 304 will automatically request the delete advisor generator 302 to provide another recommended delete-directory-entry if the amount of memory freed by the deletion of a directory entry resulted in less than two seconds worth of voice print. Then the delete function controller 304 will request the user to decide whether to delete the second recommended delete-directory-entry.

When the directory entry deletion process is completed, because either the user decides to exit the directory entry deletion process or the deletion function controller 304 detects that the directory memory 308 is empty, the deletion function controller 304 outputs an end-delete message through the speaker 116 and/or the display device 120. The end-delete message announces that the delete function is ending. Then the delete function controller 304 leaves the delete function and returns to other telephone station functions until the delete function controller 304 is restarted by another delete request.

Figure 5:
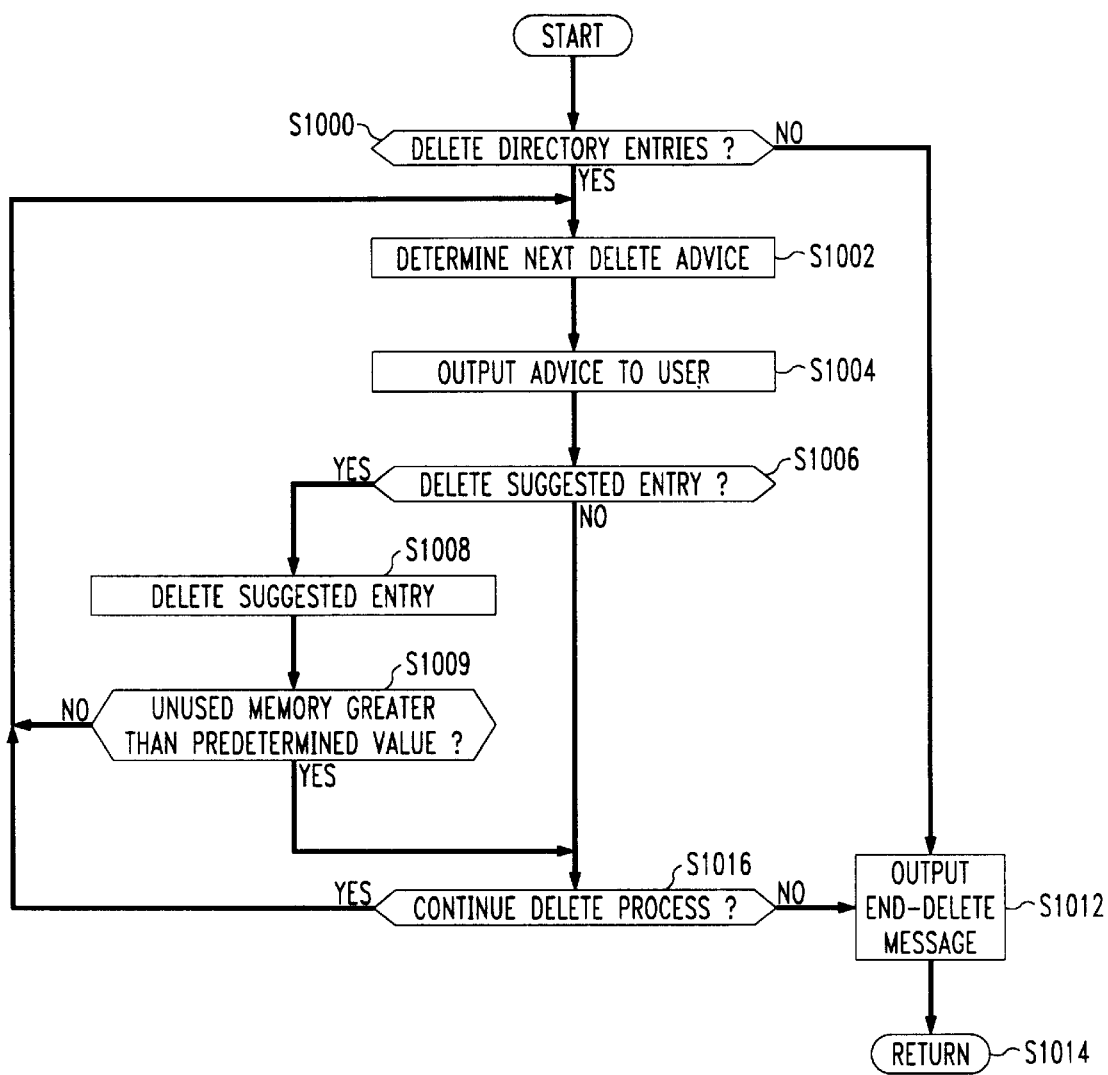
FIG. 5 is a flowchart of the directory entry delete process.

FIG. 5 shows a flowchart of the directory entry delete process. The directory entry delete process may be started in several ways. If the user attempts to add an additional directory entry into an already full directory memory 308, the delete function controller 304 goes to step S1000. The delete function controller 304 also goes to step S1000, when the user explicitly requests to delete a directory entry.

In step S1000, the delete function controller 304 queries the user whether to begin the delete-directory-entry process. If the user decides not to delete any directory entries, the delete function controller 304 enters step S1012 and outputs the end-delete message to the voice recognition controller 110 or displays the end-delete message on the display device 120 and goes to step S1014. In step S1014, the delete function controller 304 returns to other telephone station processes.

If the user decides to begin the delete directory entry process, the delete function controller 304 enters step S1002. In step S1002, the delete advice generator 302 determines a recommended delete-directory-entry as the next delete advice. Then the delete function controller 304 goes to step S1004.

In step S1004, the delete function controller 304 outputs the recommended delete-directory-entry that is produced by the delete advice generator 302. The recommended delete-directory-entry is spoken through the speaker 116 and/or displayed on the display device 120. Then the delete function controller 304 goes to step S1006.

In step S1006, the delete function controller 304 queries the user whether to delete the recommended delete-directory-entry. If the user decides to delete the recommended directory entry, the delete function controller 304 goes to step S1008. Otherwise, the delete function controller 304 goes to step S1016.

In step S1008, the delete function controller 304 deletes the recommended delete-directory-entry from the directory memory 308 through the directory manager 306. Then the delete function controller 304 goes to step S1009.

In step S1009, the delete function controller 304 determines whether the unused portion of the directory memory 308 is greater than a preset value. If the amount of unused memory is less than the preset value, the delete function controller 304 returns to step S1002 to repeat the delete directory entry process. If the amount of unused memory is greater than the preset value, the delete function controller 304 goes to step S1016.

In step S1016, the delete function controller 304 queries the user whether to continue the delete directory entry process. If the user decides to continue the delete directory process, the delete function controller 304 goes to step S1002 and repeat the delete directory entry process,. Otherwise, the delete function controller 304 goes to step S1012.

In step S1012, the delete function controller 304 outputs the end-delete message to the user to indicate that the delete process is completed. Then, the delete function controller 304 goes to step S1014 and returns to other telephone station processes.

The directory entry delete advisor 300 may be embodied in hardware using dedicated components to implement the directory manager 306, the delete advice generator 302, the directory memory 308 and the delete function controller 304. Application specific integrated circuits (ASIC) may also be used for each of the components listed above. Portions of each component may be combined into different ASICs for optimum performance characteristics.

If the voice recognition controller 110 is a high powered processor such as a digital signal processor (DSP), the complete directory entry delete advisor 300 may be implemented as a program executed by the voice recognition controller 110. Alternatively, the telephone station controller 106 in conjunction with the controller memory 108 may also implement the directory entry delete advisor functions.

Although the invention is described with reference to a telephone station 100, the invention can be applied to any system having directories and not limited to the telephone station 100. For example, the invention is easily applicable to directories associated with computer files stored on a hard disk, a magnetic tape or other storage media. The directory entry delete advisor 300 may also be implemented in a personal computer or a server where the directory entry delete advisor 300 recommends to the user the next directory entries that may be deleted.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A smart directory management method for selecting a recommended delete-directory-entry from a plurality of directory entries in a directory memory, the method comprising:

selecting the recommended delete-directory-entry using only information contained in the plurality of directory entries based on a predetermined delete strategy;

outputting the recommended delete-directory-entry to a user through a user interface device;

deleting the recommended delete-directory-entry after receiving the delete instruction from the user;

managing the directory memory;

determining the recommended delete-directory-entry based on the predetermined delete strategy and the information contained in the plurality of directory entries obtained from the directory memory; and communicating with the user through the user interface device by at least one of outputting to the user the recommended delete-directory-entry and receiving from the user data required in the managing step.

2. The method of claim 1, wherein the predetermined delete strategy comprises at least one of:

a) selecting one of the plurality of directory entries that is a bottom entry of an ordered stack;

b) selecting one of the plurality of directory entries having a largest elapsed time value since a last functional reference to the one of the plurality of directory entries;

c) selecting one of the plurality of directory entries having a largest mean elapsed time value between functional references to the one of the plurality of directory entries;

d) selecting one of the plurality of directory entries having a least importance value previously assigned by the user to the one of the plurality of directory entries; and e) selecting one of the plurality of directory entries having a lowest number of functional accesses over a previous N functional accesses of the directory memory, N being a preset integer.

3. The method claim 1, wherein the user interface device comprises at least one of a microphone, a speaker, a keypad, a display and soft keys.

4. The method of claim 1, wherein the information contained in the plurality of directory entries is updated after each functional reference.

5. A smart directory manager, comprising:

a directory memory containing a plurality of directory entries;

a user interface device;

a directory management device that generates a recommended delete-directory-entry based on a predetermined delete strategy and only information contained in the plurality of directory entries, the directory management device deleting the recommended delete-directory-entry from the directory memory when a delete instruction is received from a user through the user interface device;

a directory manager that manages the directory memory;

a delete advice generator that determines the recommended delete-directory-entry based on the predetermined delete strategy and the information contained in the plurality of directory entries obtained from the directory memory through the directory manager; and a delete function controller that controls the directory manager and the delete advice generator, the delete function controller communicating with the user through the user interface device by at least one of outputting to the user the recommended delete-directory-entry and receiving from the user data required by the directory management device.

6. The smart directory manager of claim 5, wherein the predetermined delete strategy selects at least one of the plurality of directory entries:

a) that is a bottom entry of an ordered stack;

b) having a largest elapsed time value since a last functional reference to the one of the plurality of directory entries;

c) having a largest mean elapsed time value between functional references to the one of the plurality of directory entries;

d) having a least importance value previously assigned by the user to the one of the plurality of directory entries; and e) having a lowest number of functional accesses over a previous N functional accesses of the directory memory, N being a preset integer.

7. The smart directory manager of claim 5, wherein the smart directory manager is embodied in at least one of a telephone station, a personal computer and a server.

8. The smart directory manager of claim 5, wherein the user interface device comprises at least one of a microphone, a speaker, a keypad, a display and soft keys.

9. The smart directory manager of claim 5, wherein the directory management device comprises hardware units that perform functions of at least one of the directory manager, the delete advice generator and the delete function controller.

10. The smart directory manager of claim 5, wherein the directory management device comprises a processor executing programs that perform functions of at least one of the directory manager, the delete advice generator and the delete function controller.

* * * * *